US006980897B2

(12) United States Patent
Aoki et al.

(10) Patent No.: US 6,980,897 B2
(45) Date of Patent: Dec. 27, 2005

(54) OIL PRESSURE REDUCTION RATE RESTRICTING APPARATUS FOR V-BELT TYPE CONTINUOUSLY VARIABLE TRANSMISSION

(75) Inventors: Takanori Aoki, Fuji (JP); Makoto Sawada, Fuji (JP); Masahiro Yamamoto, Fuji (JP); Midori Yamaguchi, Fuji (JP); Toshiji Iida, Fuji (JP)

(73) Assignee: Jatco LTD, (JP)

( * ) Notice: Subject to any disclaimer, the term of this patent is extended or adjusted under 35 U.S.C. 154(b) by 261 days.

(21) Appl. No.: 10/664,814

(22) Filed: Sep. 17, 2003

(65) Prior Publication Data

US 2004/0132566 A1 Jul. 8, 2004

(30) Foreign Application Priority Data

Sep. 19, 2002 (JP) ............................ 2002-274036

(51) Int. Cl.⁷ .............................................. G06F 7/00
(52) U.S. Cl. ............................ 701/51; 701/55; 477/38; 474/18; 474/28; 474/69
(58) Field of Search ............................ 701/51, 54, 55, 701/56, 58, 60, 61; 474/18, 28, 69; 477/34, 477/36, 38, 44, 46, 107

(56) References Cited

U.S. PATENT DOCUMENTS 6,095,942 A * 8/2000 Yamaguchi et al. .......... 477/40
6,104,976 A * 8/2000 Nakamura .................... 701/95
6,612,958 B2 * 9/2003 Imai et al. ................... 475/210
6,623,387 B1 * 9/2003 Luh et al. ...................... 474/28
6,645,120 B1 * 11/2003 Nishio et al. ................. 476/10
6,682,451 B1 * 1/2004 Luh et al. ...................... 474/28
6,691,012 B2 * 2/2004 Nishida et al. ............... 701/60
6,829,528 B1 * 12/2004 Kang et al. .................... 701/51

* cited by examiner

Primary Examiner—Richard M. Camby
(74) Attorney, Agent, or Firm—Rossi, Kimms & McDowell, LLP

(57) ABSTRACT

There is provided an oil pressure reduction rate restricting apparatus for a V-belt type continuously variable transmission, which is comprised of a reduction rate restricting section that calculates a reduction rate restricted secondary pressure and a reduction rate restricted primary pressure by restricting respective reduction rates of the target secondary pressure and the target primary pressure when the reduction rates of the target secondary pressure and the target primary pressure calculated by a target secondary pressure calculating section and a target primary pressure calculating section, respectively, are equal to or greater than respective predetermined values. The secondary pressure and the primary pressure are controlled based on the reduction rate restricted secondary pressure and the reduction rate restricted primary pressure whose reduction rates have been restricted such that the gradient thereof are small. This prevents the actual secondary pressure and primary pressure from undershooting the respective target pressures, and therefore prevents a shortage in torque capacity, which is caused by oil pressure decrease.

6 Claims, 6 Drawing Sheets

OIL PRESSURE REDUCTION RATE RESTRICTING APPARATUS FOR V-BELT TYPE CONTINUOUSLY VARIABLE TRANSMISSION

BACKGROUND OF THE INVENTION

1. Field of the Invention

The present invention relates to an oil pressure reduction rate restricting apparatus for a V-belt type continuously variable transmission, which is capable of restricting the rate of reduction in the target primary pressure and the target secondary pressure.

2. Description of the Prior Art

Conventionally, a V-belt type continuously variable transmission (hereinafter referred to as "belt CVT") using a V belt has been known as a continuously variable transmission which can be suitably applied to a vehicle. The belt CVT is constructed by winding the V-belt around a primary pulley and a secondary pulley, and groove widths of the primary pulley and the secondary pulley are variably controlled by oil pressure.

A first cylinder chamber and a second cylinder chamber are provided to the primary pulley and the secondary pulley, respectively. Further, the belt CVT is comprised of an oil pressure calculating section that calculates a primary pressure which is supplied to the first cylinder chamber and a secondary pressure which is supplied to the second cylinder chamber. The groove widths of the primary pulley and the secondary pulley are changed according to the oil pressures supplied to the respective cylinder chambers, and the gear ratio continuously varies according to the radius of contact between the V belt and each of the pulleys (Japanese Laid-Open Patent Publication No. 5-240331, for example).

The conventional belt CVT as described above, however, has the problem that in the case where the oil pressure calculating section instructs a rapid decrease in the primary pressure or the secondary pressure (e.g., in the case where an accel pedal is suddenly released), the actual primary pressure or the actual secondary pressure undershoots the target oil pressure. This results in a shortage in torque capacity, which has an adversary effect on gear ratio shifting.

SUMMARY OF THE INVENTION

It is therefore an object of the present invention to provide an oil pressure reduction rate restricting apparatus for a V-belt type continuously variable transmission, which is capable of preventing undershoot of the actual primary pressure or the actual secondary pressure caused by the rapid decrease in the instructed pressures, correcting the reduction rate of the target primary pressure and/or the target secondary pressure by restriction in the case where at least one of the target primary pressure and the target secondary pressure has become equal to or greater than a predetermined value.

To attain the above object, there is provided an oil pressure reduction rate restricting apparatus for a V-belt type continuously variable transmission in which a primary pressure is applied to a primary pulley connected to an engine side and a secondary pressure is applied to a secondary pulley connected to an output shaft, comprising: a target primary pressure calculating section that calculates a target primary pressure as a target value of the primary pressure supplied to the primary pulley; a target secondary pressure calculating section that calculates a target secondary pressure as a target value of the secondary pressure supplied to the secondary pulley; and a reduction rate restricting section that restricts rates of reduction in the target primary pressure and the target secondary pressure calculated by the target primary pressure calculating section and the target secondary pressure calculating section, respectively; and wherein the reduction rate restricting section is operable when a reduction rate of at least one of the target primary pressure and the target secondary pressure is equal to or greater than a predetermined value, for correcting the rate of reduction in the target primary pressure or the target secondary pressure by restriction to thereby prevent a rapid decrease in the target primary pressure or the target secondary pressure.

With the above arrangement, the rate of reduction in the target secondary pressure or target primary pressure which has been rapidly decreased is lowered by restriction. As a result, it is possible to prevent the actual secondary pressure and the actual primary pressure, which decrease in accordance with the target secondary pressure and the target primary pressure, from undershooting the respective target oil pressures. This prevents a shortage in torque capacity, which is caused by undershooting and has an adversary effect on gear ratio shifting.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
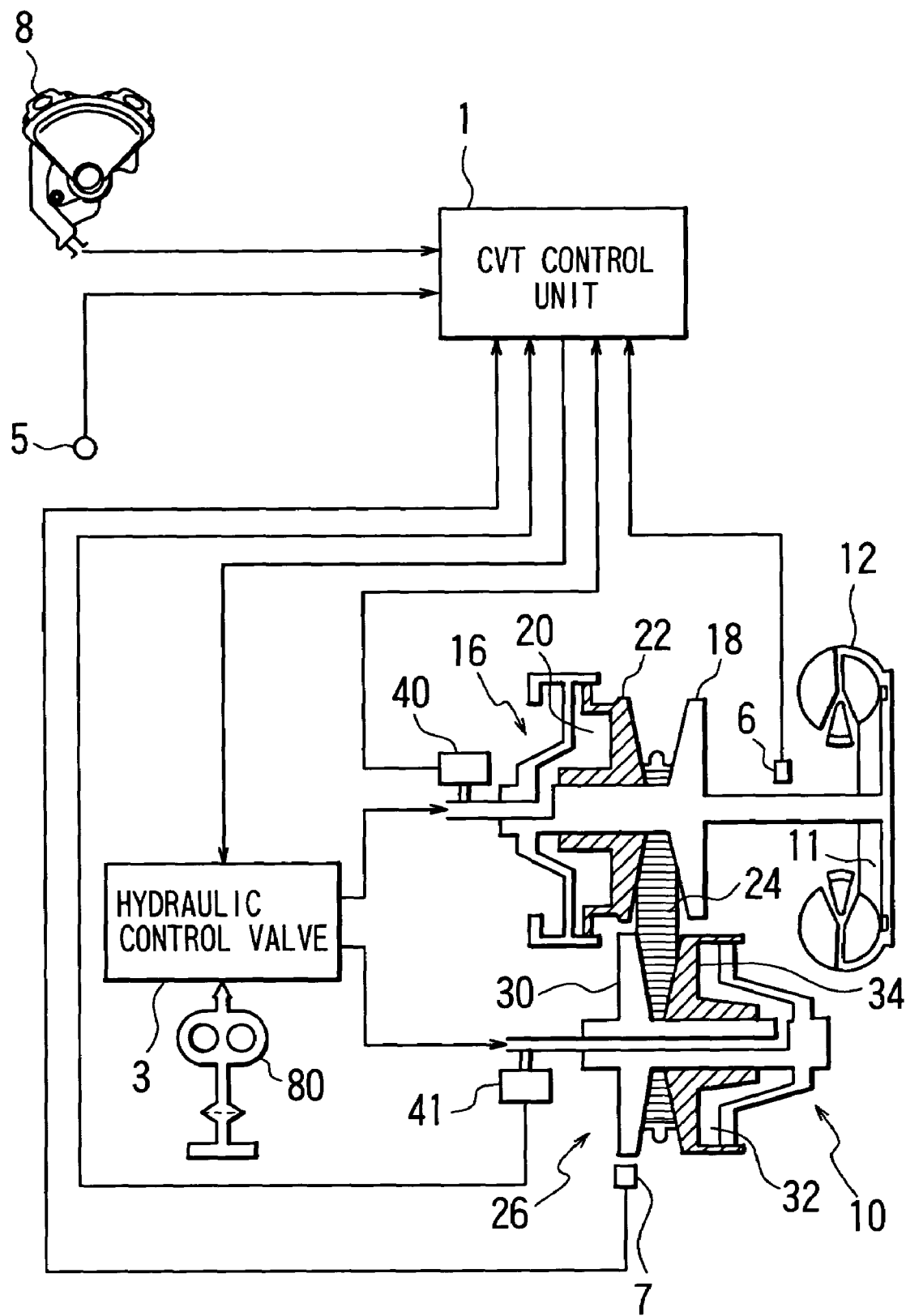
FIG. 1 is a diagram showing the construction of an oil pressure reduction rate restricting apparatus for a V-belt type continuously variable transmission according to an embodiment of the present invention.

FIG. 1 is a diagram schematically showing the construction of an oil pressure reduction rate restricting apparatus applied to a belt CVT according to a first embodiment of the present invention.

As shown in FIG. 1, a transmission mechanism 10 is comprised of a pair of variable pulleys consisting of a primary pulley 16 and a secondary pulley, and the pair of variable pulleys 10 and 11 are connected to each other via a V belt 24. The transmission mechanism 10 is connected to an engine, not shown, via a torque converter 12 including a lockup clutch 11.

The primary pulley 16 is constructed such that a V-shaped pulley groove is formed by a fixed conical plate 18 which rotates integrally with an output shaft of the torque converter 12, and a movable conical plate 22 opposed to the fixed conical plate 18. The primary pulley 16 is provided with a first cylinder chamber 20 that applies oil pressure to the back surface of the movable conical plate 22 to displace it in the axial direction.

The secondary pulley 26 is constructed such that a V-shaped pulley groove is formed by a fixed conical plate 30, which rotates integrally with an output shaft for an axle, and a movable conical plate 34 opposed to the fixed conical plate 30. The movable conical plate 34 is forced by a return spring (not shown) in a direction to narrow the pulley groove. The secondary pulley 26 is provided with a second cylinder chamber 32 that applies oil pressure to the back surface of the movable conical plate 34 to displace it in the axial direction.

The transmission mechanism 10 is controlled by a hydraulic control valve 3 in accordance with a signal from a CVT control unit 1. The hydraulic control valve 3 regulates an oil pressure supplied from oil pump 80 to generate a line pressure. The hydraulic control valve controls the line pressure to a predetermined pressure to generate a primary pressure in accordance with the signal from the CVT control unit 1, and supplies the primary pressure to the first cylinder chamber 20. Similarly, the hydraulic control valve 3 controls the line pressure to a predetermined value to generate a secondary pressure, and supplies the secondary pressure to the second cylinder chamber 32.

It should be noted that the pressure-receiving area of the first cylinder chamber 20 is set to be greater than that of the second cylinder chamber 32.

To provide feedback control of oil pressures supplied to the first cylinder chamber 20 and the second cylinder chamber 32, a primary pressure sensor 40 that measures the primary pressure is provided in an oil channel connected to the first cylinder chamber 20, and a secondary pressure sensor 41 that measures the secondary pressure is provided in an oil channel connected to the second cylinder chamber 32. The results of the measurement carried out by the primary pressure sensor 40 and the secondary pressure sensor 41 are inputted to the CVT control unit 1.

The CVT control unit 1 controls the hydraulic control valve 3 according to a select position signal inputted from an inhibitor switch 8, the throttle valve opening (the accelerator pedal stroke) TVO obtained from a throttle opening sensor 5, and the engine torque estimated from the engine speed Ne.

Further, a first speed sensor 6 and a second speed sensor 7, which detect the respective rotational speeds of the primary pulley 16 and the secondary pulley 26, are connected to the CVT control unit 1, and the gear ratio of the transmission mechanism 10 is found according to signals indicative of the detection results. The rotational speed detected by the second speed sensor 7 is multiplied by a predetermined value to find the vehicle speed.

The primary pressure applied to the first cylinder chamber 20 is controlled by the hydraulic control valve 3 to change the groove width of the primary pulley 16, and the secondary pressure is applied to the second cylinder chamber 32 to change the pulley ratio of the primary pulley 16 to the secondary pulley 26, so that gear shifting can be acoccomplished. Further, the pressure which is applied to support the V belt 24 from both sides thereof is controlled according to the primary pressure and the secondary pressure, and a driving force is transmitted by the frictional force which is generated due to contact between the V belt 24 and the pulleys 16 and 26.

If this is considered in terms of the rotational speed, in the case when the groove width of the primary pulley 16 is increased to such an extent that the contact radius of the V belt 24 is small and the contact radius of the secondary pulley 26 is large, i.e., the pulley ratio is Low (low speed range), the gear ratio is increased so that engine torque can be outputted to the axle while the engine speed is being decreased. Conversely, if the pulley ratio is High (high speed range), engine torque is outputted at a small gear ratio. In the meantime, the gear ratio continuously varies according to the contact radius ratio of the primary pulley 16 to the secondary pulley 26.

A description will now be given of how the primary pressure and the secondary pressure are controlled so as to prevent the occurrence of undershooting.

Figure 2:
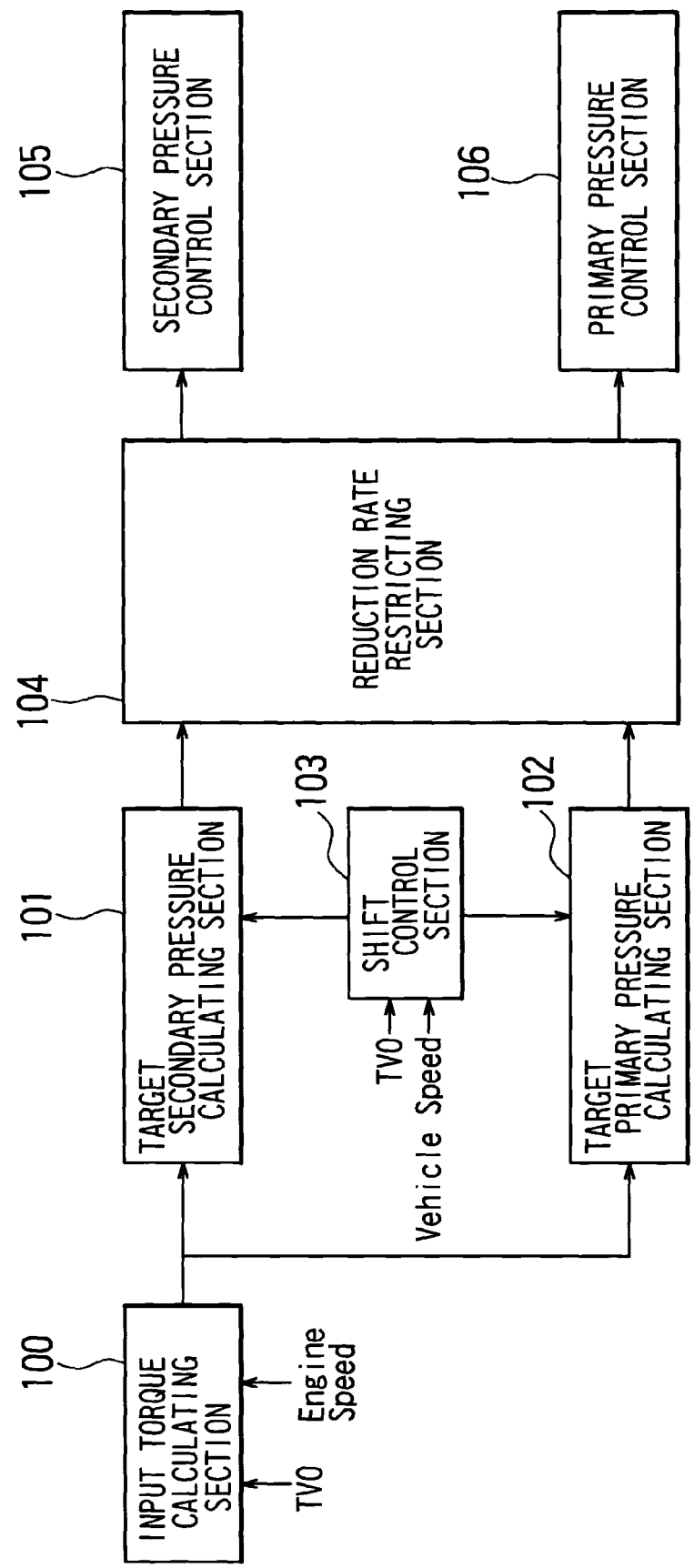
FIG. 2 is a block diagram showing the arrangement of component parts related to control.

FIG. 2 is a block diagram showing component parts related to control of the primary pressure and the secondary pressure by the CVT control unit 1.

An input torque calculating section 100 calculates the torque which is inputted from the engine to the belt CVT via the torque converter 12 according to the throttle valve opening and so forth inputted to the CVT control unit 1.

A shift control section 103 calculates the target pulley ratio of the primary pulley 16 to the secondary pulley 26. Further, the shift control section 103 calculates such target primary pressure and target secondary pressure that the pulley ratio of the primary pulley 16 to the secondary pulley 26 is equal to the target pulley ratio.

A target secondary pressure calculating section 101 calculates the target secondary pressure according to the pressure, which is applied to support the V belt 24 from both sides thereof, based on the input torque calculated by the input torque calculating section 100. Further, the target secondary pressure calculating section 101 adds the target secondary pressure calculated by the shift control section 103 to the target secondary pressure calculated by the target secondary pressure calculating section 101.

Similarly, a target primary pressure calculating section 102 calculates the target primary pressure according to the pressure, which is applied to support the V belt 24 from both sides thereof, based on the input torque calculated by the input torque calculating section 100. Further, the target secondary pressure calculating section 101 adds the target primary pressure calculated by the shift control section 103 to the target primary pressure calculated by the target primary pressure calculating section 102.

In the case where the rate of reduction in the target secondary pressure calculated by the target secondary pressure calculating section 101 or in the target primary pressure calculated by the target primary pressure calculating section 102 are equal to or greater than respective predetermined values, a reduction rate restricting section 104 restricts the rate of reduction in the respective target oil pressures so that the reduction rate can be small. The target secondary pressure and the target primary pressure whose reduction rates have been restricted by the reduction rate restricting section 104 will hereafter be referred to as "the reduction rate restricted secondary pressure" and "the reduction rate restricted primary pressure", respectively. On the other hand, in the case where the reduction rates of the respective target oil pressures are smaller than the respective predetermined values, the reduction rate restricting section 104 does not restrict the rate of reduction in the target secondary pressure or the target primary pressure.

The reduction rate restricting section 104 outputs the calculated reduction rate restricted secondary pressure and reduction rate restricted primary pressure, or the target secondary pressure and the target primary pressure to a secondary pressure control section 105 and a primary pressure control section 106.

The secondary pressure control section 105 and the primary pressure control section 106 control the hydraulic control valve 3 so that the target oil pressure inputted from the reduction rate restricting section 104 can be achieved.

Figure 3:
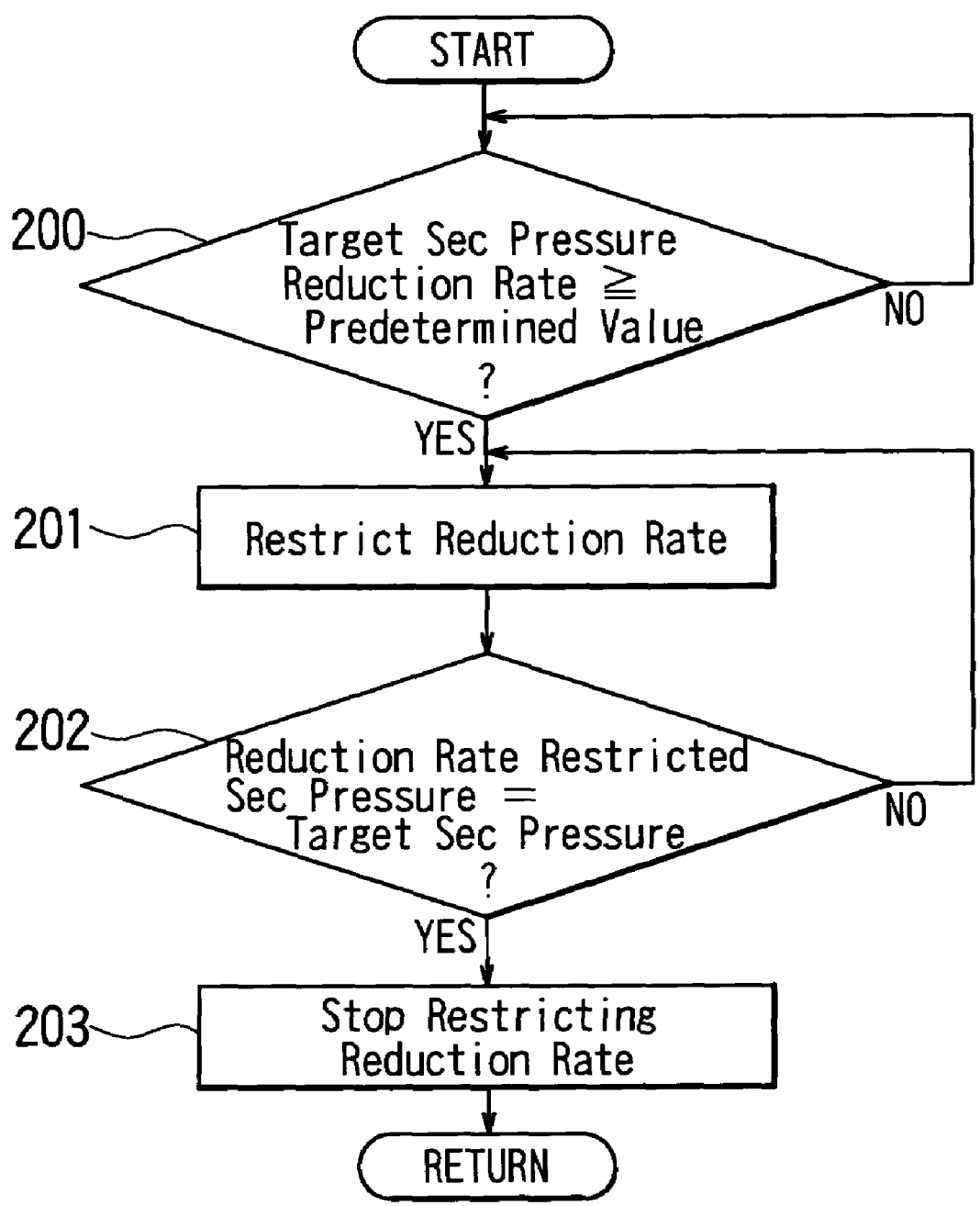
FIG. 3 is a flow chart showing the procedure for providing control to restrict the reduction rate.
Figure 4A:
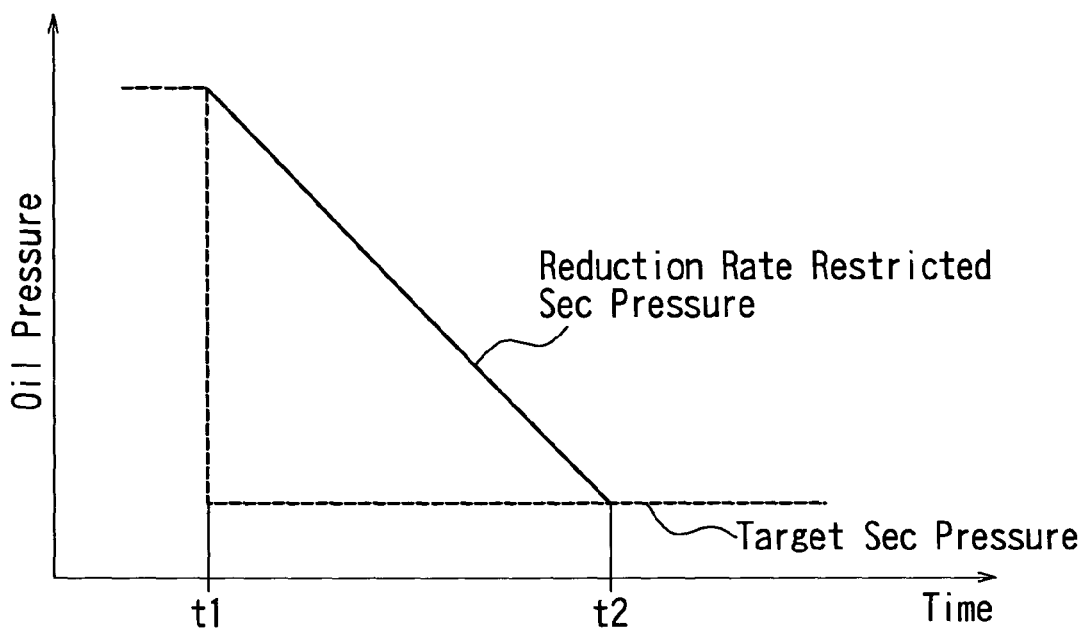
FIG. 4A is a graph showing the relationship between the target secondary pressure and the reduction rate restricted secondary pressure.

A description will now be given of how the rates of reduction in the target secondary pressure and the target primary pressure are controlled by the reduction rate control section 104 with reference to FIGS. 3 and 4A. FIG. 3 shows a flow of control provided by the reduction rate control section 104, and FIG. 4A shows the reduction rate restricted secondary pressure and the target secondary pressure.

First, a description will be given of how the rate of reduction in the target secondary pressure is restricted.

In a step 200, it is determined whether or not the rate of reduction in the target secondary pressure (target Sec pressure) inputted from the target secondary pressure calculating section 101 is equal to or greater than a predetermined value. If the determination result is positive, the process proceeds to a step 201.

In the step 201, the reduction rate restricted secondary pressure is calculated by restricting the rate of reduction in the target secondary pressure. The target secondary pressure indicated by broken lines in FIG. 4A is the one whose reduction rate has not yet been restricted.

The reduction rate restricted secondary pressure is calculated such that it has a small gradient from a time point t1 the rate of reduction in the target secondary pressure becomes equal to or greater than a predetermined value as shown in FIG. 4A. Therefore, from the time point t1, the secondary pressure control section 105 controls the hydraulic control valve 3 based on the reduction rate restricted secondary pressure which decreases gradually, so that the secondary pressure supplied to the second cylinder chamber 32 can be regulated.

In a step 202, it is determined whether or not the reduction rate restricted secondary pressure has become equal to the decreased target secondary pressure calculated by the target secondary pressure calculating section 101. If it is determined that the reduction rate restricted secondary pressure has not become equal to the target secondary pressure calculated by the target secondary pressure calculating section 101, the process returns to the step 201 wherein the reduction rate restricted secondary pressure is continuously calculated.

On the other hand, if it is determined in the step 202 that the reduction rate restricted secondary pressure has become equal to the target secondary pressure calculated by the target secondary pressure calculating section 101 at a time point t2 in FIG. 4A, the process proceeds to a step 203 to stop restricting the reduction rate.

Upon completion of all the processing, the process returns to the step 200 to repeat the above described processing.

It should be noted that the rate of reduction in the target primary pressure can be restricted in the same manner as in the case where the rate of reduction in the target secondary pressure is restricted.

As described above, when the rates of reduction in the target secondary pressure and the target primary pressure calculated by the target secondary pressure calculating section 101 and the target primary pressure calculating section 102, respectively, are equal to or greater than respective predetermined value, the reduction rate restricting section 104 restricts the rates of reduction in the respective target oil pressures to calculate the reduction rate restricted secondary pressure and the reduction rate restricted primary pressure whose reduction rates are low. The secondary pressure control section 105 and the primary pressure control section 106 control the hydraulic control valve 3 according to the calculated reduction rate restricted secondary pressure and reduction rate restricted primary pressure, thus regulating the secondary pressure and the primary pressure.

According to the present embodiment described above, the secondary pressure and the primary pressure are controlled such that when the rates of reduction in the target secondary pressure and the target primary pressure are equal to or greater than respective predetermined values, the reduction rate restricting section 104 restricts the rates of reduction in the respective oil pressures to make smaller the gradient of the reduction rate. This enables each of the actual secondary pressure and the actual primary pressure to follow the target oil pressure in a reliable manner, and even in the case where the target secondary pressure and the target primary pressure are instructed to rapidly decrease, the actual secondary pressure and the actual primary pressure never undershoot the respective target oil pressures. This prevents a shortage in torque capacity, which has conventionally occurred due to oil pressure decrease caused by undershooting and has an adversary effect on gear shifting of the belt CVT.

Figure 4B:
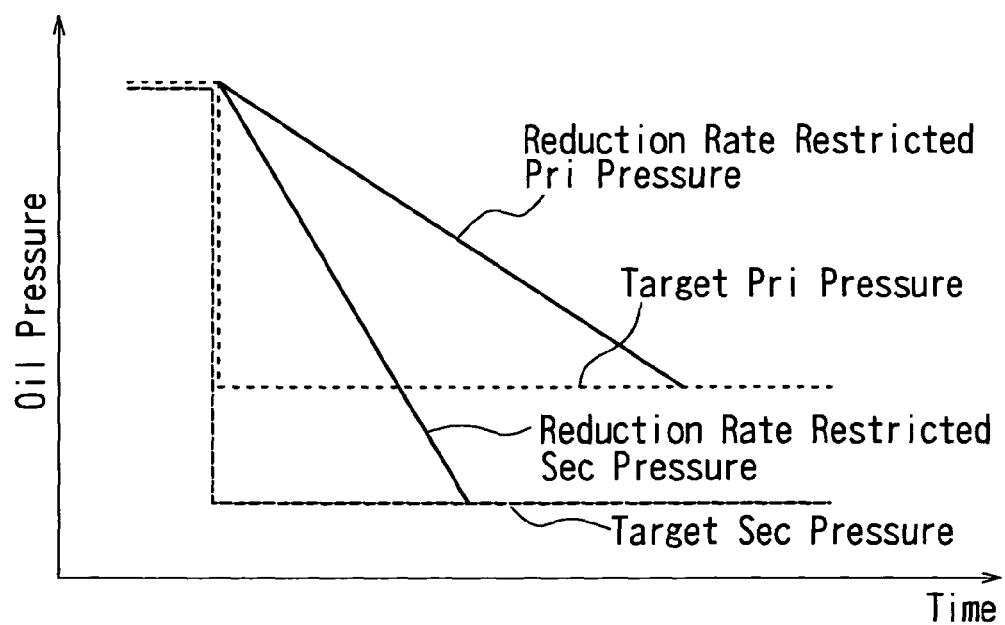
FIG. 4B is a graph showing the relationship between the target pressures and the reduction rate restricted pressures.

It should be noted that as shown in FIG. 4B, the reduction rate restricting section 104 may set different reduction rates for the reduction rate restricted secondary pressure and the reduction rate restricted primary pressure. This ensures a differential pressure between the secondary pressure and the primary pressure required for gear shifting by the belt CVT.

Further, it should be noted that the reduction rate restricting section 104 may set the same reduction rate (gradient of reduction) for the reduction rate restricted secondary pressure and the reduction rate restricted primary pressure. This makes it possible to decrease the oil pressure while maintaining a difference between the secondary pressure and the primary pressure. In the case where the same reduction rate (gradient of reduction) is set for the reduction rate restricted secondary pressure and the reduction rate restricted primary pressure, for example, the reduction rate restricted secondary pressure is calculated first, and a difference between the reduction rate restricted secondary pressure and the target secondary pressure is added to the target primary pressure to calculate the reduction rate restricted primary pressure. This makes it possible to calculate the reduction rate restricted secondary pressure and the reduction rate restricted primary pressure whose reduction rates are equal.

A description will now be given of a second embodiment of the present invention.

The present embodiment differs from the above described first embodiment only in the way of providing control to restrict the rates of reduction in the target secondary pressure and the target primary pressure by the reduction rate restricting section 104, and in other respects, the present embodiment is identical with the first embodiment.

Figure 5:
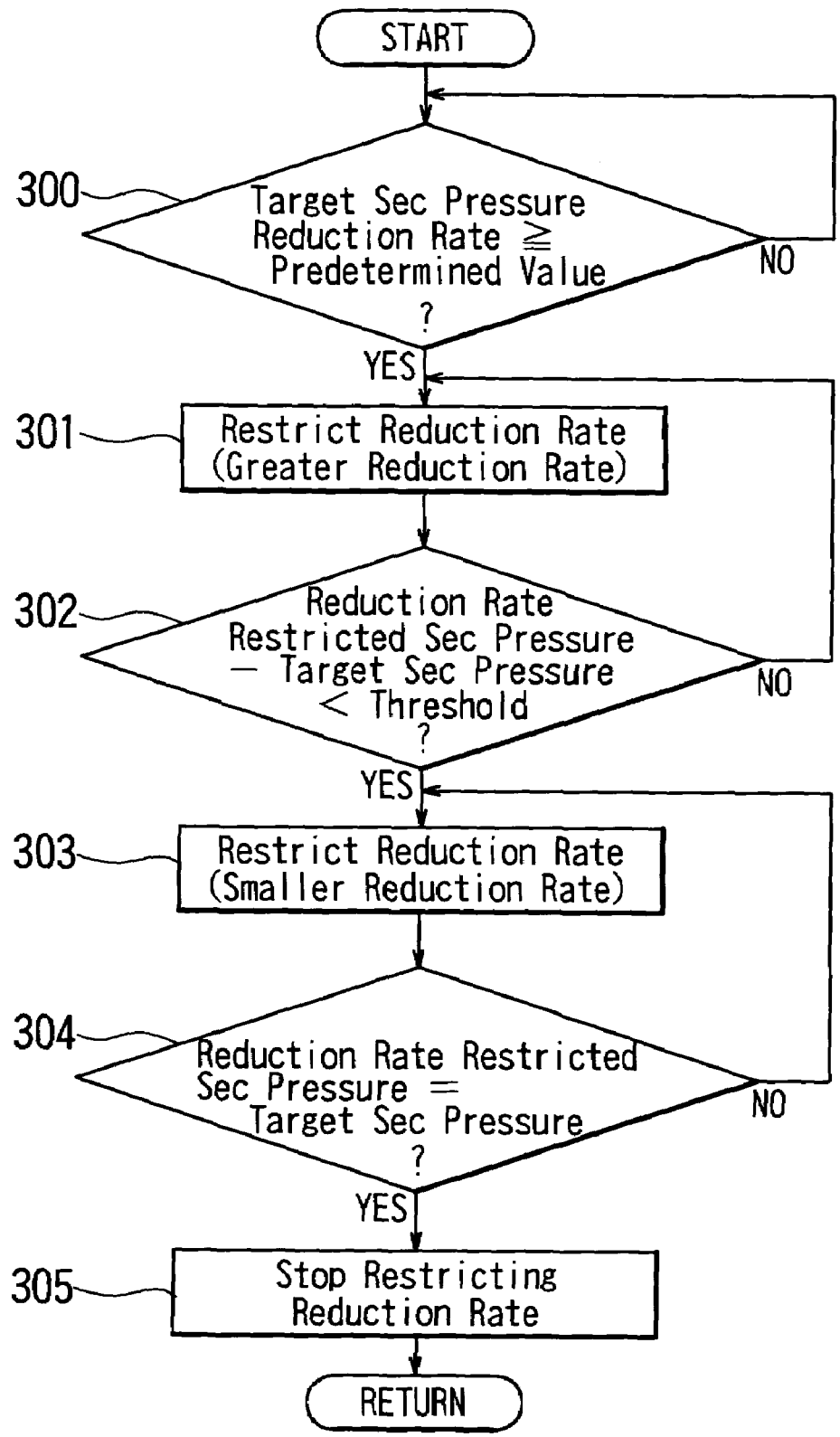
FIG. 5 is a flow chart showing the procedure for providing control to restrict the reduction rate according to a second embodiment of the present invention.
Figure 6A:
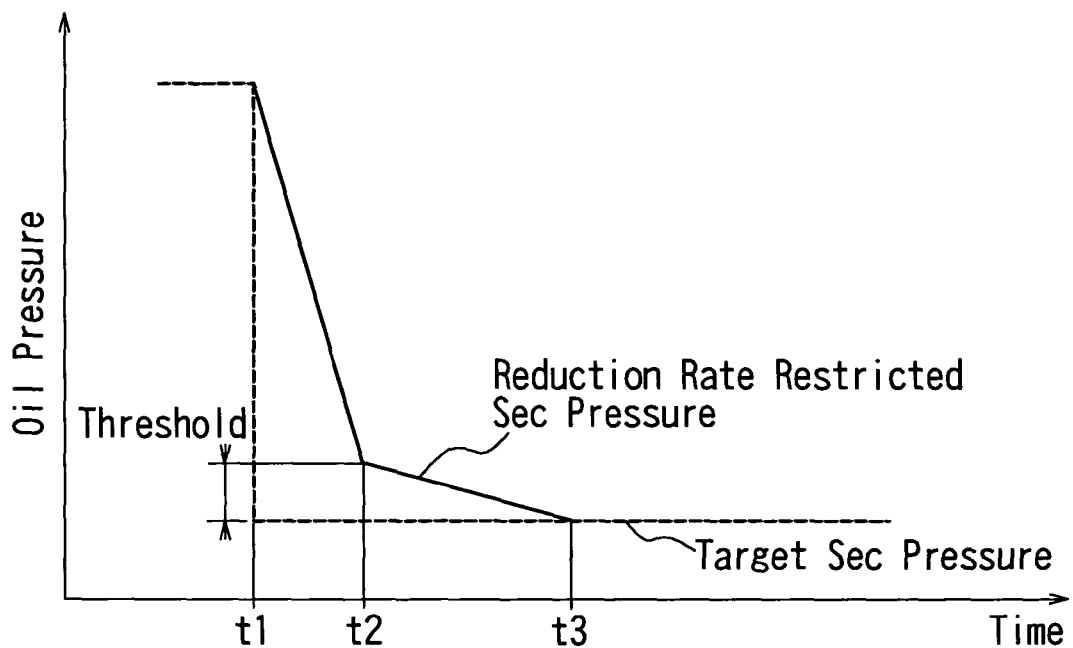
FIG. 6A is a graph showing the relationship between the target secondary pressure and the reduction rate restricted secondary pressure in the second embodiment of the present invention.

A description will be given of how the rates of reduction in the target secondary pressure and the target primary pressure are restricted by the reduction rate restricting section 104 with reference to FIGS. 5 and 6A. FIG. 5 is a flow chart showing the procedure for providing control to restrict the reduction rate, and FIG. 6A is a graph showing the relationship between the reduction rate restricted secondary pressure and the target secondary pressure.

First, a description will now be given of how the rate of reduction in the target secondary pressure is restricted.

In a step 300, it is determined whether or not the rate of reduction in the target secondary pressure (target Sec pressure) inputted from the target secondary pressure calculating section 101 is equal to or greater than a predetermined value. If the determination result is positive, the process proceeds to a step 301.

In the step 301, the reduction rate restricted secondary pressure (reduction rate restricted Sec pressure) is calculated by restricting the rate of reduction in the target secondary pressure. The reduction rate restricted secondary pressure is calculated such that it has a smaller gradient than that of the target secondary pressure from a time point t1 the rate of reduction in the target secondary pressure becomes equal to or greater than the predetermined value as shown in FIG. 6A. It is assumed that the reduction rate for the reduction rate restricted secondary pressure calculated in the step 301 is greater than the reduction rate for the reduction rate restricted secondary pressure calculated in a step 303, described later (from a time point t2 to t3 in FIG. 6A). Therefore, from the time point t1, the secondary pressure control section 105 controls the secondary pressure supplied to the second cylinder chamber 32 by controlling the hydraulic control valve 3 based on the calculated reduction rate restricted secondary pressure.

In a step 302, it is determined whether or not a value obtained by subtracting the decreased target secondary pressure calculated by the target secondary pressure calculating section 101 from the reduction rate restricted secondary pressure has become smaller than a predetermined threshold or not. If the determination result is negative, the process returns to the step 301 wherein the rate of reduction in the target secondary pressure is restricted. If the determination result is positive, the process proceeds to the step 303. It is assumed that the value becomes smaller than the predetermined threshold at the time point t2 in FIG. 6A.

In the step 303, the reduction rate restricted secondary pressure is calculated by restricting the target secondary pressure with a smaller degree than in the step 301. Specifically, the gradient of the reduction rate restricted secondary pressure from the time point t2 is made smaller than the gradient from the time point t1 to t2. Therefore, from the time point t2, the reduction rate restricted secondary pressure gradually becomes closer to the target secondary pressure calculated by the target secondary pressure calculating section 101.

In a step 304, it is determined whether the reduction rate restricted secondary pressure has become equal to the decreased target secondary pressure calculated by the target secondary pressure calculating section 101. If it is determined that the reduction rate restricted secondary pressure has not become equal to the decreased target secondary pressure calculated by the target secondary pressure calculating section 101, the process returns to the step 303 wherein the reduction rate restricted secondary pressure is continuously calculated.

On the other hand, if it is determined in the step 304 that the reduction rate restricted secondary pressure has become equal to the decreased target secondary pressure calculated by the target secondary pressure calculating section 101 as indicated at the time point t3 in FIG. 6A, the process proceeds to a step 305 to stop restricting the reduction rate.

Upon completion of all the processing, the process returns to the step 300 to repeat the above processing.

As described above, when restricting the rate of reduction in the target secondary pressure, the reduction rate restricting section 104 calculates the reduction rate target secondary pressure with two-stage reduction rates. The actual secondary pressure is quickly decreased based on the reduction rate restricted secondary pressure with a higher reduction rate, and is then gradually made closer to the target secondary pressure calculated by the target secondary pressure calculating section 101 based on the reduction rate restricted secondary pressure with a lower reduction rate. As a result, even if the actual target secondary pressure undershoots the reduction rate restricted secondary pressure at the time point t2 in FIG. 6A, the target secondary pressure never becomes lower than the decreased target secondary pressure specified by the target secondary pressure calculating section 101.

It should be noted that the rate of reduction in the target primary pressure can be restricted in the same manner as in the case where the rate of reduction in the target secondary pressure is restricted.

According to the present embodiment as described above, two-stage reduction rates are set in restricting the rates of reduction in the target secondary pressure and the target primary pressure, and hence it is possible to prevent undershooting and quickly decrease the actual secondary pressure and primary pressure by setting a higher reduction rate from the time point t1 to t2 in FIG. 6A. Since the oil pressure can be decreased more quickly as compared with the above described first embodiment, the line pressure supplied from the oil pump 80 can also be quickly decreased from a high pressure to a low pressure, which leads to a decrease in the load applied to the engine which drives the oil pump 80. Further, according to the prior art, frictional loss occurs between the primary pulleys 16 and the secondary pulley 26 and the V belt 24 due to the pressure applied to support the V belt 24 from both sides thereof, but according to the present embodiment, the frictional loss can be reduced by quickly decreasing the oil pressure, and the fuel economy can be improved as a result.

Figure 6B:
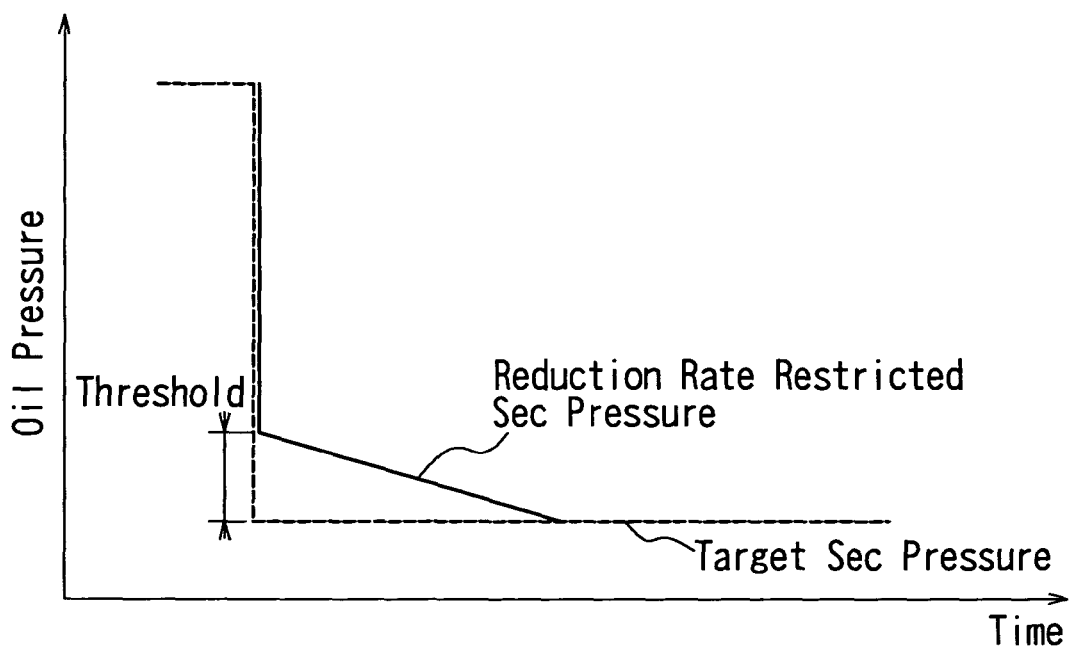
FIG. 6B is a graph showing the relationship between the target secondary pressure and the reduction rate restricted secondary pressure in other example.

Although in the present embodiment, two-stage reduction rates are set and the oil pressure is decreased using a higher one of the reduction rates, the present invention is not limited to this, but as shown in FIG. 6B, the reduction rate restricted secondary pressure may be decreased first without restricting the reduction rate, and from a time point a difference between the reduction rate restricted secondary pressure and the target secondary pressure becomes smaller than a predetermined threshold, the secondary pressure may be decreased by restricting the reduction rate for the reduction rate restricted secondary pressure. This makes it possible to quickly decrease the oil pressure.

It should be noted that as is the case with the above described first embodiment, different reduction rates may be set for the reduction rate restricted primary pressure and the reduction rate restricted secondary pressure so that a differential pressure can be generated between the secondary pressure and the primary pressure. Further, as is the case with the above described first embodiment, for example, the reduction rate restricted primary pressure may be calculated by adding a difference between the calculated reduction rate restricted secondary pressure and the target secondary pressure whose reduction rate has not yet been restricted may be added to the target primary pressure.

Further, the reduction rate restricted secondary pressure and the reduction rate for the reduction rate restricted primary pressure may be varied according to differences between the reduction rate restricted secondary pressure and the reduction rate restricted primary pressure, and the target secondary pressure and the target primary pressure. Further, although in the present embodiment, two-stage reduction rates are set to decrease the primary pressure and the secondary pressure, the present invention is not limited to this, but three or more stage reduction rates may be set, or the reduction rate may be curvedly varied. Therefore, the optimum reduction rate can be set to overcome undershooting occurring under various oil pressure conditions, and hence the oil pressure can be quickly decreased.

It should be understood that the present invention is not limited to the embodiments described above, but various variations of the above described embodiments may be possible without departing from the spirits of the present invention.

What is claimed is:

1. An oil pressure reduction rate restricting apparatus for a V-belt type continuously variable transmission in which a primary pressure is applied to a primary pulley connected to an engine side and a secondary pressure is applied to a secondary pulley connected to an output shaft, comprising:
    a target primary pressure calculating section that calculates a target primary pressure as a target value of the primary pressure supplied to the primary pulley;
    a target secondary pressure calculating section that calculates a target secondary pressure as a target value of the secondary pressure supplied to the secondary pulley; and
    a reduction rate restricting section that restricts rates of reduction in the target primary pressure and the target secondary pressure calculated by said target primary pressure calculating section and said target secondary pressure calculating section, respectively; and
    wherein said reduction rate restricting section is operable when at least one of the target primary pressure and the target secondary pressure is equal to or greater than a predetermined value, for correcting the rate of reduction in the target primary pressure or the target secondary pressure by restriction to thereby prevent a rapid decrease in the target primary pressure or the target secondary pressure.

2. An oil pressure reduction rate restricting apparatus for a V-belt type continuously variable transmission according to claim 1, wherein said reduction rate restricting section is operable when restricting the target primary pressure or the target secondary pressure, for variably setting the rate of reduction according to a difference between the target primary pressure or target secondary pressure whose reduction rate has been restricted and the target primary pressure or target secondary pressure whose reduction rate has not yet been restricted.

3. An oil pressure reduction rate restricting apparatus for a V-belt type continuously variable transmission according to claim 2, wherein said reduction rate restricting section is operable when restricting the target primary pressure or the target secondary pressure, for decreasing the target primary pressure or the target secondary pressure first without restricting the rate of reduction, and is operable after a difference between the decreased target primary pressure or target secondary pressure and the target primary pressure or target secondary pressure whose reduction rate has not yet been restricted has become equal to or smaller than a predetermined value, for restricting the rate of reduction in the target primary pressure or the target secondary pressure.

4. An oil pressure reduction rate restricting apparatus for a V-belt type continuously variable transmission according to claim 2, wherein said reduction rate restricting section is operable when restricting the target primary pressure or the target secondary pressure, for setting a high reduction rate to decrease the target primary pressure or the target secondary pressure, and is operable after the target primary pressure or the target secondary pressure has been decreased to a predetermined value, for setting a small reduction rate to decrease the target primary pressure and the target secondary pressure.

5. An oil pressure reduction rate restricting apparatus for a V-belt type continuously variable transmission according to any of claims 1 to 4, wherein said reduction rate restricting section is operable when restricting the target primary pressure or the target secondary pressure, for setting reduction rates separately for the target primary pressure and the target secondary pressure.

6. An oil pressure reduction rate restricting apparatus for a V-belt type continuously variable transmission according to any of claims 1 to 4, wherein said reduction rate restricting section is operable when restricting the target primary pressure or the target secondary pressure, for restricting the rate of reduction in one of the target primary pressure and the target secondary pressure and adding a difference between the target primary pressure or the target secondary pressure whose reduction rate has not been restricted and the target primary pressure or target secondary pressure whose reduction rate has been restricted to the other one of the target primary pressure and the target secondary pressure.

\* \* \* \* \*